United States Patent
Bohm et al.

(10) Patent No.: US 9,672,083 B2
(45) Date of Patent: Jun. 6, 2017

(54) OPERATING A PROGRAM CODE OBJECT IN CONJUNCTION WITH AN APPLICATION CONTEXT

(71) Applicant: International Business Machines Corporation, Armonk, NY (US)

(72) Inventors: Fraser P. Bohm, Salisbury (GB); Ian J. Mitchell, Eastleigh (GB); Philip I. Wakelin, Eastleigh (GB); Matthew A. Webster, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/413,108

(22) PCT Filed: Jul. 1, 2013

(86) PCT No.: PCT/IB2013/055389
§ 371 (c)(1),
(2) Date: Jan. 6, 2015

(87) PCT Pub. No.: WO2014/009845
PCT Pub. Date: Jan. 16, 2014

(65) Prior Publication Data
US 2015/0205649 A1 Jul. 23, 2015

(30) Foreign Application Priority Data
Jul. 12, 2012 (GB) .................................. 1212426.9

(51) Int. Cl.
G06F 9/44 (2006.01)
G06F 9/54 (2006.01)

(52) U.S. Cl.
CPC .................................. *G06F 9/547* (2013.01)

(58) Field of Classification Search
None
See application file for complete search history.

(56) References Cited

U.S. PATENT DOCUMENTS 6,529,962 B1  3/2003  Azagury et al.
7,552,420 B1  6/2009  Smith et al.
(Continued)

FOREIGN PATENT DOCUMENTS

CN    102446311 A    5/2012
WO    WO 02/075474 A2    9/2002
(Continued)

OTHER PUBLICATIONS

Kaisler, Stephen J., "Software Paradigms", Book published by Wiley Publishing, http://read.pudn.com/downloads95/ebook/389146/(Wiley)%20Software%20Paradigms.pdf, Mar. 2005, pp. 34-37.

(Continued)

*Primary Examiner* — Andy Ho
*Assistant Examiner* — Abdou Seye
(74) *Attorney, Agent, or Firm* — Francis Lammes; Stephen J. Walder, Jr.; William A. Kinnaman, Jr.

(57) ABSTRACT

A method is provided for operating a program code object in conjunction with an application context in an application server environment. The method includes identifying a program code object in the application server environment and identifying an application context enabling the provision of a service. The application context is not directly accessible by the program code object. An entry point of the program code object is identified and a tag identifier referencing the application context is associated with the entry point. When executing the program code object in the application server environment, the tag identifier is used to access the application context.

20 Claims, 3 Drawing Sheets

(56) References Cited

U.S. PATENT DOCUMENTS

| | | | |
|---|---|---|---|
| 7,607,175 B2* | 10/2009 | Susser | G06F 9/468 |
| | | | 726/27 |
| 7,877,629 B2* | 1/2011 | Nall | G06F 9/4812 |
| | | | 712/228 |
| 2002/0178299 A1* | 11/2002 | Teubner | G06F 9/546 |
| | | | 719/320 |
| 2002/0194147 A1* | 12/2002 | Ricke | G06N 5/00 |
| | | | 706/53 |
| 2006/0136875 A1* | 6/2006 | Thorpe | G06F 21/16 |
| | | | 717/122 |
| 2008/0208568 A1 | 8/2008 | Haluptzok et al. | |
| 2008/0271044 A1 | 10/2008 | Yordanov | |
| 2009/0282474 A1* | 11/2009 | Chen | G06F 21/53 |
| | | | 726/21 |
| 2010/0153915 A1 | 6/2010 | Schneider | |
| 2011/0016205 A1* | 1/2011 | Debettencourt | H04L 67/22 |
| | | | 709/224 |
| 2012/0005722 A1 | 1/2012 | Olsen et al. | |
| 2012/0036507 A1 | 2/2012 | Jonnala et al. | |
| 2012/0304200 A1* | 11/2012 | Oliver | G06F 9/4843 |
| | | | 719/319 |

FOREIGN PATENT DOCUMENTS

| WO | WO2011/051255 A1 | 5/2011 |
|---|---|---|
| WO | WO2014/009845 A1 | 1/2014 |

OTHER PUBLICATIONS

Mell, Peter et al., "The NIST Definition of Cloud Computing", The National Institute of Standards and Technology, U.S. Department of Commerce, Special Publication 800-145, Sep. 2011, 7 pages.

* cited by examiner

OPERATING A PROGRAM CODE OBJECT IN CONJUNCTION WITH AN APPLICATION CONTEXT

BACKGROUND

The present invention relates to the operation of a program code object such as an application in conjunction with an application context.

The concept of the software framework is widely used in current computing deployments. More information may be found for example in "Software Paradigms" by Stephen H. Kaisler (2005), p. 34-37. It is particularly applicable in the developing model of networked computing known as Cloud computing. Cloud computing allows access as needed to a pool of shared and configurable computing resources such as applications, services and storage. A more detailed definition may be found for example in "The NIST Definition of Cloud Computing" by Peter Mell and Timothy Grance.

A software framework is software that provides an architectural skeleton suitable for a particular group of software programs. Examples in the area of software deployment include the Spring Framework from Vmware Inc., Enterprise JavaBeans and the .NET Framework from Microsoft Corporation (Java and all Java-related trademarks and logos are trademarks or registered trademarks of Oracle Corporation in the US and other countries).

Many frameworks have the concept of work executing under specific contexts. These contexts, or application contexts, are implemented by software objects which allow the framework to offer a number of specific capabilities or services to work which executes in the contexts. Services provided cover, for example, aspects of configuration and data sharing, and might include workload management, state sharing, state isolation, dynamic resource binding, billing, historical tracking, runtime program definitions and the like. Example contexts in known software frameworks include Request Context, Session Context, Application Context and User Context. An advantage of using context within a framework is that work may be moved within the system but retain the context and its associated services. This is of particular importance when operating in a Cloud computing environment. For example, a billing service provided by a billing context may be retained across different operations involving a process running within the Cloud to produce a correct final billing total. A common framework characteristic is that program code objects, known as framework plugins or framework extensions, operating under the framework are required to conform to the specific programming model or coding conventions of the framework (with regard to the definitions of interfaces, or annotations in the code, for example).

An application server is a computer server which provides services to application software. Examples of such services are data services, security services, transaction processing, workload management and the like. Examples include Oracle Corporation's WebLogic, SAP NetWeaver Application Server and IBM Corporation's WebSphere Application Server. Another example is IBM Corporation's Customer Information Control System (CICS) Transaction Server (IBM, WebSphere and CICS are trademarks or registered trademarks of International Business Machines Corporation, registered in many jurisdictions worldwide. Other product or service names may be trademarks or registered trademarks of others).

The CICS family of products provide application servers primarily concerned with online transaction processing and services related to it. CICS supports a wide variety of applications and operating systems. It provides an extensive application programming interface (API) and also controls a number of resources behind applications, for example security, databases, files, programs, transactions etc. that applications use. In a CICS system, the term transaction is used for a piece of processing initiated by a single request. A single transaction consists of one or more application programs that, when run, carry out the processing needed. The term task also has a specific meaning in CICS, and may be seen as being analogous to a thread. When CICS receives a request to run a transaction, it starts a new task that is associated with this one instance of the execution of the transaction. When the transaction completes, the task is terminated.

Another concept in CICS systems is that of running processes in CICS regions. A CICS region is a named instance of CICS (for example a named instance of CICS Transaction Server) running in its own address space. A CICS region can be started and stopped independently of other CICS regions. An application request can comprise more than one CICS task and can flow between CICS regions. A further CICS concept is that of the CICS bundle. A CICS bundle is a group of CICS resources (program and data files) which together form an installable whole. A bundle represents an application or part of an application.

It would be desirable to be able to provide for application servers such as CICS the advantages of using application context as it is provided by a software framework. It would be desirable to do this without having to rewrite application code, and so as to take advantage of features of the Cloud computing model.

SUMMARY

In one illustrative embodiment, a method is provided of operating a program code object in conjunction with an application context in an application server environment. The illustrative embodiment identifies a program code object in the application server environment. The illustrative embodiment identifies, in the application server environment, the application context enabling the provision of a service, the application context not directly accessible by the program code object. The illustrative embodiment identifies an entry point of the program code object. The illustrative embodiment associated with the entry point a tag identifier referencing the application context. The illustrative embodiment executes the program code object in the application server environment and using the tag identifier to access the application context.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Preferred embodiments of the present invention will now be described, by way of example only, with reference to the accompanying drawings in which.

DETAILED DESCRIPTION

Figure 1:
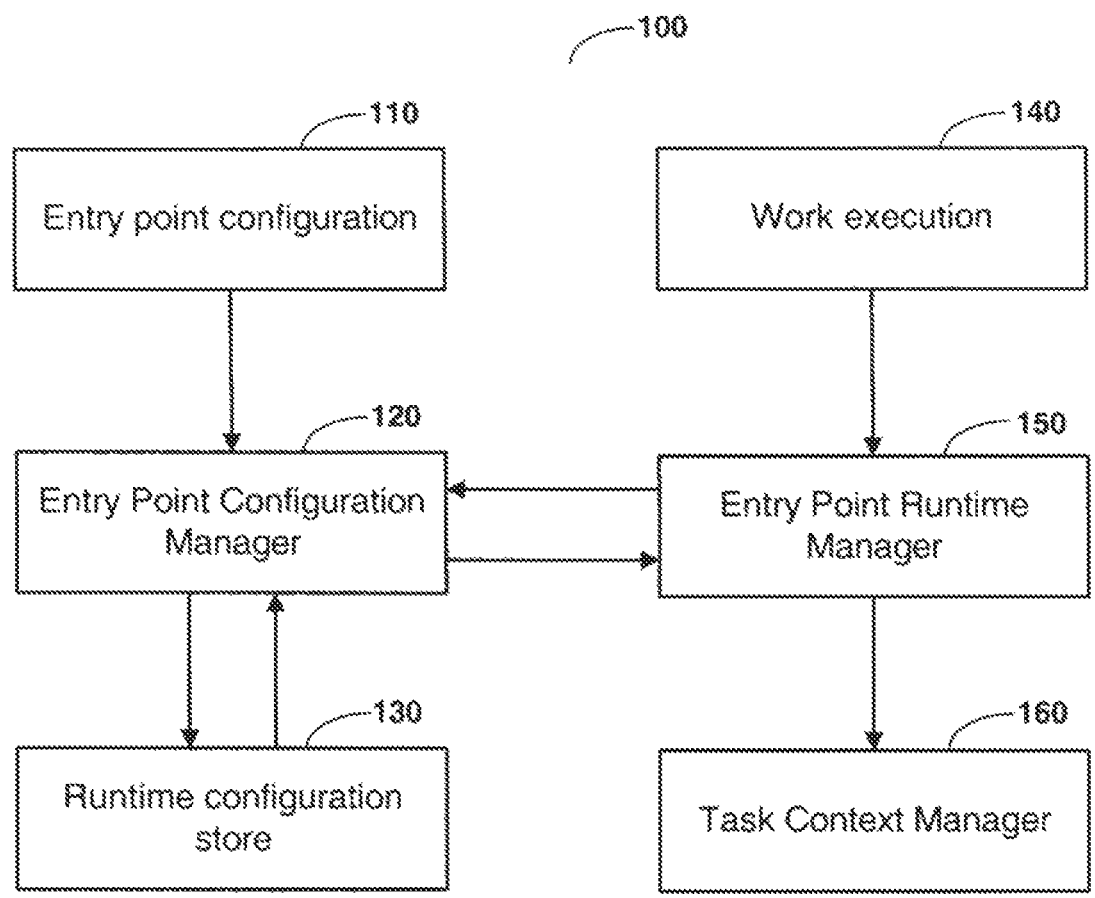
FIG. 1 illustrates an overview of a process according to a preferred embodiment of the invention.

FIG. 1 illustrates an overview of the component parts of a preferred embodiment of the present invention. The preferred embodiment may, for example, be implemented within a system running the CICS Transaction Server product. The remainder of this description is couched in terms of this exemplary CICS system. It will be clear to one of ordinary skill in the art that embodiments in other application servers will comprise equivalent elements. In a preferred embodiment, a context management system 100 comprises two main parts, a configuration part and an execution part. Configuration of a CICS application begins at step 110. The CICS application is examined by an Entry Point Configuration Manager 120. This comprises software for identifying entry points to the application. An entry point identifies a CICS resource which is an access point where work enters the application. An entry point can apply to the whole application or a specific application operation. For example, entry points in an application dedicated to file handling can be declared for create, read, update and delete operations. Entry Point Configuration Manager 120 comprises a number of configuration agent components, one for each entry point type which is to have an associated context. On identifying an entry point of the appropriate type, a tag identifier is associated with the entry point and details are recorded in runtime configuration store 130.

In an execution part, a request for work execution enters the system at 140 and a task is assigned to it. It is examined by an Entry Point Runtime Manager at 150. The Entry Point Runtime Manager checks for associated application context. If an entry point is identified without associated application context, Entry Point Configuration Manager 120 is queried as to whether an application context is available for that entry point type. Entry Point Configuration Manager 120 queries runtime configuration store 130. If an application context is available it returns the tag identifier representing that application context to Entry Point Runtime Manager 150 which associates it with the task. As task execution progresses through the system, Task Context Manager 160 ensures that the tag for the identified application context remains linked to the task so that the application context continues to be available to the task. This linkage continues if the task is moved between processing areas, such as between CICS regions, for example.

Figure 2:
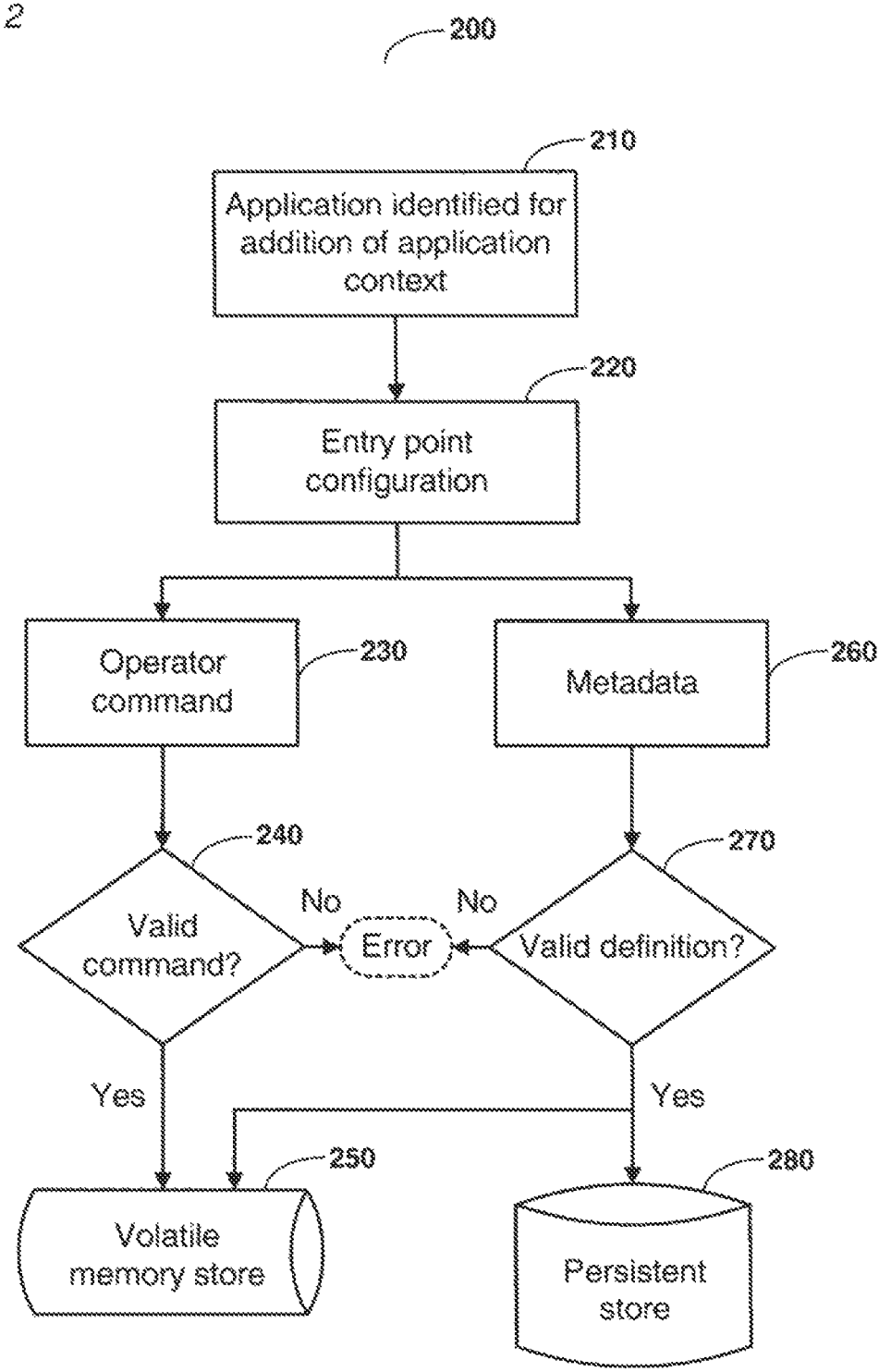
FIG. 2 illustrates a configuration process according to a preferred embodiment of the invention.

An entry point configuration process will now be described in more detail. According to a preferred embodiment of the present invention, two configuration options are available. It will be apparent to one skilled in the art that other configuration options are possible without departing from the scope of the invention. In various embodiments, the first described option, or the second described option, or both options may be available. FIG. 2 illustrates the two options for configuration process 200 according to the preferred embodiment.

At step 210, a CICS application is identified for addition of application context. The application includes one or more entry points each of which each identifies a CICS resource which is an access point to the application. At step 220 the Entry Point Configuration Manager 120 begins entry point configuration. In a preferred embodiment, Entry Point Configuration Manager 120 comprises configuration agent components, one for each entry point type.

In the first configuration option at step 230, a configuration agent component of Entry Point Configuration Manager 120 provides an operation API to allow an operator to set a tag identifier through an operation command. For example, where the resource PROGRAM is an entry point a SET OPERATION command might be entered on the PROGRAM(BANKING) instance of resource type PROGRAM as follows:

SET ENTRYSCOPE(cicsapplication://Banking/CurrentAccounts/1/0/0)

The expression in parentheses represents the tag identifier applied to the entry point. In this case it is a URI (uniform resource identifier). After command entry, a validation step 240 is applied. If the command tests as valid, it is stored in runtime configuration store 130 in volatile memory store 250, if not an error message results. In this option, the tag identifier persists only for as long as the associated CICS system is active and is purged from memory at task completion.

In the second configuration option, the configuration agent component of Entry Point Configuration Manager 120 provides a declarative configuration mechanism for recording the tag identifier. In a preferred embodiment, the tag identifier is applied in the form of metadata at step 260. In this embodiment, a CICS bundle which may represent a CICS application or part of one, includes a bundle manifest comprising an xml file cics.xml. To add the same tag identifier as described above with reference to the first configuration option, the following xml code is added:

<modify>
<entrypoint type="http://www.ibm.com/xmlns/prod/cics/bundle/PROGRAM" name="BANKING entryScope="cicsapplication://Banking/CurrentAccounts/1/0/0"/>
</modify>

A validation step 270 is applied and if the definition is valid, an entry is made in the runtime configuration store 130 in volatile memory store 250 as for the first configuration option, if not an error message results. In addition, with this option the xml file will also be stored in persistent store 280 and so will survive the ending of the CICS task and will persist after a system restart. If the definition is invalid, an error message results In a preferred embodiment, the tag described above is defined by six elements as follows:

PLATFORM: the platform name of the application for which the program is defined as an entry point.

APPLICATION: the name of the application for which the program is defined as an entry point.

OPERATION: the name of the application operation for which the program is defined as an entry point.

APPLMAJORVER: the major version number of the application for which the program is defined as an entry point.

APPLMINORVER: the minor version number of the application for which the program is defined as an entry point.

APPLMICROVER: the micro version number of the application for which the program is defined as an entry point.

In the example used with reference to FIG. 2 above, "PLATFORM" is Banking, "APPLICATION" is CurrentAccount, and the three version number options are respectively 1, 0 and 0. OPERATION defines the operation associated with the entry point, such as a create, read, update, or delete operation, and is separately specified. The application context thus identifies the platform, the application, the application version, and the operation.

Figure 3:
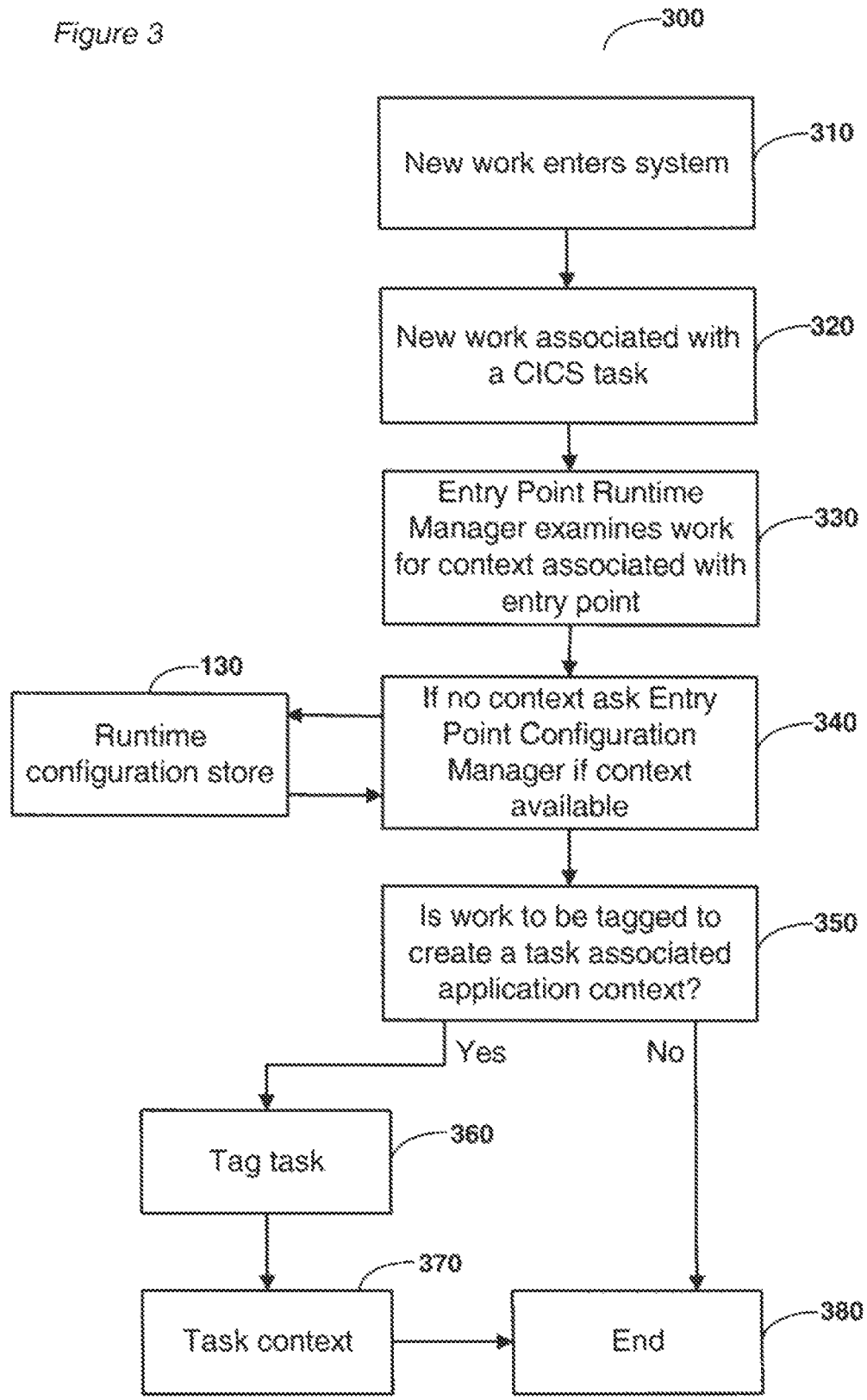
FIG. 3 illustrates an execution process according to a preferred embodiment of the present invention.

FIG. 3 illustrates the execution flow 300 of work entering a system that has been configured using either of the above techniques according to a preferred embodiment of the present invention. New work enters the system at step 310. It is associated with a CICS task at 320. At step 330, the Entry Point Runtime Manager 150 examines the work entry points for associated application context. If application context is absent, it queries the Entry Point Configuration Manager 120 at step 340. Entry Point Configuration Manager 120 queries the runtime configuration store 130 on whether application context is available to be associated with the entry points. If associated application context is found, a decision is made at step 350 based on rules or policies associated with the work whether the task should be tagged. If the answer is positive, the tag identifier associated with the application context is attached to the task at step 360. The application context referenced by the tag identifier is now available to the running task at step 370. Task Context Manager 160 ensures by reference to the tag identifier that the application context remains associated with the task wherever it is being executed until the task terminates at step 380. If the answer at step 350 is negative, the task terminates at step 380.

It will be apparent to one skilled in the art that the embodiments of the invention described above allow application context to be linked to an application request which can comprise more than one task. When a task does not have an application context attached to it and calls a program that has an application entry point which has a tag identifier, as described above with reference to a preferred embodiment, an application context is associated with the task, and with any subsequent tasks that it calls. In various embodiments, various application context services may therefore be provided.

In an exemplary embodiment, the present invention might be used, for example, for monitoring and measuring how much resource an application or a particular application operation is using across CICS regions and multiple tasks. In a further exemplary embodiment, the present invention might be used for applying a policy to tasks that are part of an application, to define threshold conditions to manage the behaviour of tasks. In yet a further exemplary embodiment, the present invention might be used in conjunction with transaction tracing capability within CICS to quickly identify and diagnose application-related problems.

Advantageously, the above described embodiments provide for the use of application context without requiring the program code of the original application to be modified. Embodiments also provide for application context to be maintained when processing migrates to a different server, for example.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of operating a program code object in conjunction with an application context in an application server environment, the method comprising:

identifying, in an application server environment, the application context for enabling a provisioning of a service to execute a specific type of work specified within a received work execution request, the application context not directly accessible by a program code object;

identifying a set of entry points into the program code object, wherein each entry point in the set of entry points identifies a resource which is an access point where work enters the program code object;

for each entry point in the set of entry points, determining whether the entry point is of an entry point type to handle the application context;

responsive to identifying one or more entry points whose entry point type can handle the application context, associating with at least one entry point a tag identifier referencing the application context; and executing the program code object in the application server environment using the tag identifier to access the application context and complete work associated with the received work execution request.

2. The method according to claim 1, wherein the tag identifier is associated with the at least one entry point by means of an operator command to place the tag identifier in a memory location referenced by the program code object at runtime.

3. The method according to claim 1, wherein the tag identifier is associated with the at least one entry point by means of the addition of the tag identifier to a configuration file referenced by the program code object at runtime.

4. The method according to claim 1, wherein the program code object comprises application software.

5. The method according to claim 1, wherein the application context comprises a runtime object giving access to the service.

6. The method according to claim 1, wherein the service is one or more selected from: a configuration service; a data sharing service; a monitoring service; a trace service; a workload management service; a state sharing service; a state isolation service; a dynamic resource binding service; a billing service; a transactional service; a historical tracking service; or a runtime program definitions service.

7. The method according to claim 1, wherein the application serve environment is operable within a cloud computing model.

8. A system comprising:

a processor; and a memory coupled to the processor, wherein the memory comprises instructions which, when executed by the processor, cause the processor to:

identify, in the application server environment, an application context for enabling a provisioning of a service to execute a specific type of work specified within a received work execution request, the application context not directly accessible by a program code object;

identify a set of entry points into the program code object, wherein each entry point in the set of entry points identifies a resource which is an ace mint where work enters the program code object;

for each entry point in the set of entry points determine whether the entry point s of an entry point type to handle the application context;

responsive to identifying one or more entry points whose entry point type can handle the application context, associate with at least one entry point a tag identifier referencing the application context; and execute the program code object in the application server environment using the tag identifier to access the application context and complete work associated with the received work execution request.

9. The system according to claim 8, wherein the tag identifier is associated with the at least one entry point and placed in a memory location referenced by the program code object at runtime.

10. The system according to claim 8, wherein the tag identifier is associated with the at least one entry point by means of the addition of the tag identifier to a configuration file referenced by the program code object at runtime.

11. The system according to claim 8, wherein the program code object comprises application software.

12. The system according to claim 8, wherein the application context comprises a runtime object giving access to the service.

13. The system according to claim 8, wherein the service is one or more selected from: a configuration service; a data sharing service; a monitoring service; a trace service; a workload management service; a state sharing service; a state isolation service; a dynamic resource binding service; a billing service; a transactional service; a historical tracking service; or a runtime program definitions service.

14. The system according to claim 8, wherein the application server environment is operable within a cloud computing model.

15. A computer program product comprising a non-transitory computer readable storage medium having a computer readable program stored therein, wherein the computer readable program, when executed on a computer system, causes the computer system to:
identify, in the application server environment, an application context for enabling a provisioning of a service to execute a specific type of work specified within a received work execution request, the application context not directly accessible by a program code object;
identify a set of entry points into the program code object, wherein each entry point in the set of entry points identifies a resource which is an access point where work enters the pro ram code object;
for each entry point in the set of entry points, determine whether entry point is of an entry point type to handle the application context;
responsive to identifying one or more entry points whose entry point type can handle the application context, associate with at least one entry point a tag identifier referencing the application context; and
execute the program code object in the application server environment using the tag identifier to access the application context and complete work associated with the received work execution request.

16. The computer program product of claim 15, wherein the tag identifier is associated with the at least one entry point and placed in a memory location referenced by the program code object at runtime.

17. The computer program product of claim 15, wherein the tag identifier is associated with the at least one entry point by means of the addition of the tag identifier to a configuration file referenced by the program code object at runtime.

18. The computer program product of claim 15, wherein program code object comprises application software.

19. The computer program product of claim 15, wherein the application context comprises a runtime object giving access to the service.

20. The computer program product of claim 15, wherein the service is one or more selected from: a configuration service; a data sharing service; a monitoring service; a trace service; a workload management service; a state sharing service; a state isolation service; a dynamic resource binding service; a billing service; a transactional service; a historical tracking service; or a runtime program definitions service.

* * * * *